United States Patent
Kim

(10) Patent No.: US 8,088,432 B2
(45) Date of Patent: Jan. 3, 2012

(54) INSTANT FOOD-TYPE SOYBEAN PASTE BLENDED WITH SEA URCHIN EGGS AND METHOD OF MANUFACTURING THE SAME

(75) Inventor: Seon-Won Kim, Gyeongsangbuk-do (KR)

(73) Assignee: Uljin-gun (Uljin County), Gyeongsangbuk-do (KR)

( * ) Notice: Subject to any disclaimer, the term of this patent is extended or adjusted under 35 U.S.C. 154(b) by 349 days.

(21) Appl. No.: 12/549,760

(22) Filed: Aug. 28, 2009

(65) Prior Publication Data

US 2011/0052783 A1    Mar. 3, 2011

(51) Int. Cl.
*A23L 1/20* (2006.01)
(52) U.S. Cl. ......... 426/634; 426/385; 426/643; 426/444
(58) Field of Classification Search .................. 426/385, 426/634, 643, 444
See application file for complete search history.

(56) References Cited

FOREIGN PATENT DOCUMENTS

| JP | 71-027340 | * | 8/1971 |
|---|---|---|---|
| JP | 55-013011 | * | 1/1980 |
| JP | 57-054570 | * | 4/1982 |
| JP | 60-153777 | * | 8/1985 |
| JP | 02-060549 | * | 3/1990 |
| KR | 101997023640 | | 6/1997 |
| KR | 1020060007198 | | 1/2006 |
| KR | 100743569 B1 | | 7/2007 |
| KR | 2007109933 | * | 11/2007 |

OTHER PUBLICATIONS

Ru 2197253. Abstract. Jan. 2003.*

* cited by examiner

*Primary Examiner* — Anthony Weier
(74) *Attorney, Agent, or Firm* — Summa, Additon & Ashe, P.A.

(57) ABSTRACT

Shown is a method for manufacturing an instant-type soybean paste blend made with sea urchin eggs, having grinding lyophilized sea urchin eggs; blending 100 parts by weight of an aged soybean paste, with 16 to 30 parts by weight of the ground sea urchin eggs; lyophilizing the soybean paste blend with sea urchin eggs for 15 to 20 hours to a water content of 5 to 10%; and packing the lyophilized soybean paste blend made with sea urchin eggs. Packed in a unit dose suitable for one meal, the soybean paste blend can be readily used in the precise amount necessary for cooking. Blended with sea urchin eggs, the soybean paste is rich in various nutrients. Foods cooked with the soybean paste blend are imparted with the flavor of sea urchin eggs and the nutrients of the soybean paste as well as those of the sea urchin eggs.

12 Claims, 1 Drawing Sheet

[Figure 1]
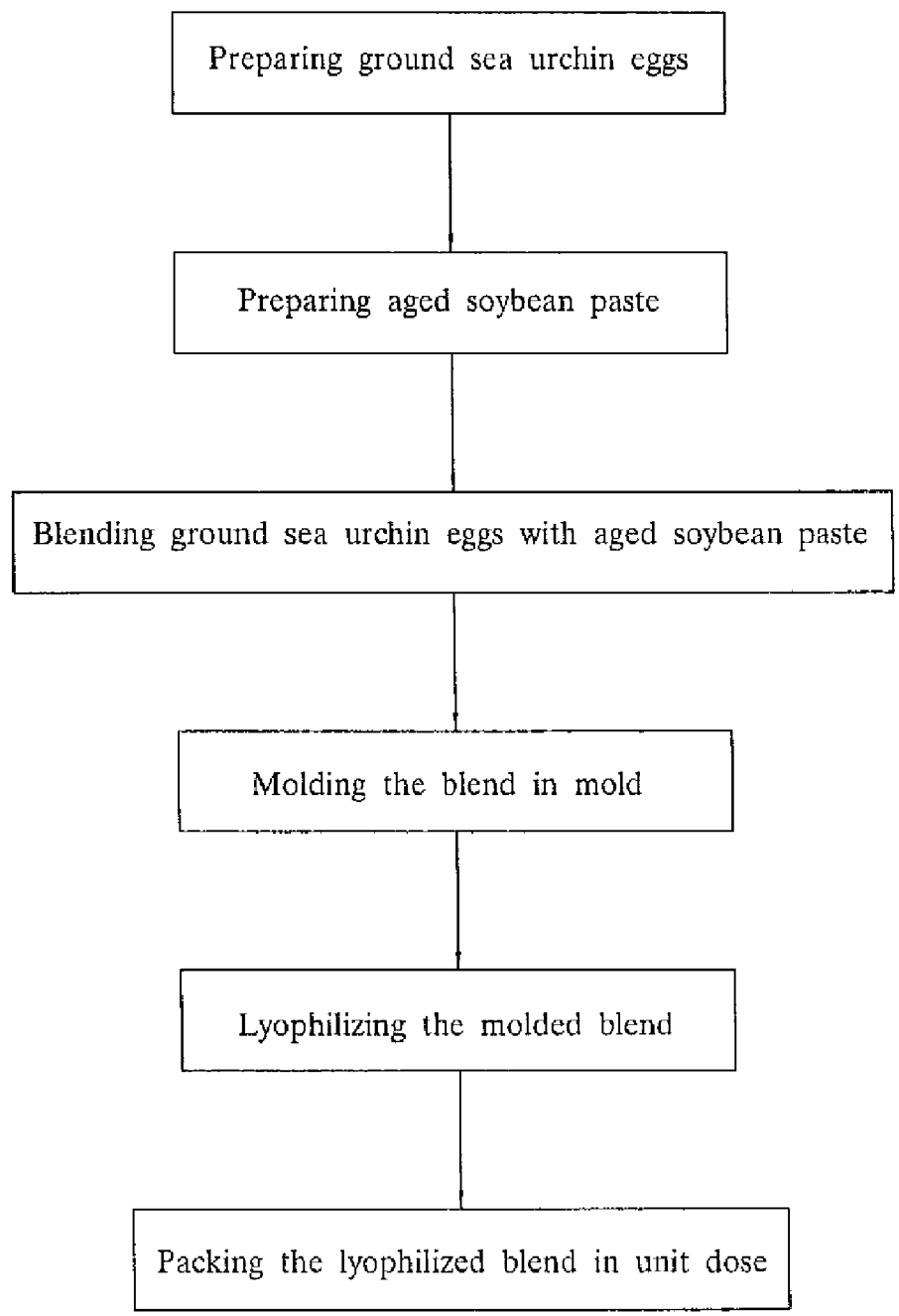

INSTANT FOOD-TYPE SOYBEAN PASTE BLENDED WITH SEA URCHIN EGGS AND METHOD OF MANUFACTURING THE SAME

FIELD OF THE INVENTION

The present invention relates to an instant food-type soybean paste blend made with sea urchin eggs. More particularly, the present invention relates to an instant food-type soybean paste blend made with sea urchin eggs which can be stored for a long period of time and can be readily cooked when necessary. Also, the present invention is concerned with a method for manufacturing the same.

BACKGROUND

The fermented food "Doenjang" is composed predominantly of soybeans. It is made by fermenting boiled soybeans in brine. It is one of Korea's representative traditional foods, dating back to ancient times and is in the form of soybean paste. Hereinafter it is referred to as "the soybean paste."

Based on soybeans, the fermented food is rich in various nutrients including proteins, carbohydrates and lipids. With abundant nutrients, the soybean paste itself has been used as a seasoning in addition to as a main food material, especially as a protein source.

Typically, the preparation of the soybean paste is done by dissolving salt in water to give brine, immersing cakes of boiled soybeans in the brine in a crock for a predetermined time period, withdrawing the cakes of boiled soybeans from the crock, and allowing the cakes of boiled soybeans to ferment in a separate crock for a predetermined time period.

The soybean paste thus prepared is stored in that state in the crock or in a separate vessel in a refrigerator.

Because the soybean paste is a fermented food and is likely to undergo putrefaction during storage, its state requires frequent monitoring. If it is not managed carefully, the soybean paste may frequently become putrefied and be rendered worthless.

This biological vulnerability is the main barrier to the commercial distribution of the soybean paste.

SUMMARY OF THE INVENTION

It is therefore an object of the present invention to provide a soybean paste blend which can be applied to cooking when necessary and can be suitable for commercial distribution with ease and may be easily stored for a long period of time.

It is another object of the present invention to provide a soybean paste blend which is useful as a food material supplemented with the various nutrients and flavors of sea urchin eggs.

It is a further object of the present invention to provide a method for manufacturing the soybean paste blend.

In order to accomplish the above object, the present invention provides a method for manufacturing an instant-type soybean paste blend made with sea urchin eggs, comprising the following steps: grinding lyophilized sea urchin eggs to give a powder of lyophilized sea urchin eggs; blending about 100 parts by weight of a soybean paste, aged for at least one year, with between about 16 to 30 parts by weight of the ground sea urchin eggs; lyophilizing the soybean paste blend with sea urchin eggs for between about 15 to 20 hours to a water content of between about 5 to 10%; and packing the lyophilized soybean paste blend made with sea urchin eggs. The term "lyophilize" refers to freeze-drying and the term "lyophilized" refers to freeze-dried (e.g., lyophilized sea urchin eggs are eggs that have been dried by freezing in a high vacuum).

In an embodiment of the present invention, the packing step may be performed using a container or a vinyl bag. For example, the packaging step may be performed using a flexible bag, a flexible tube, a multi-compartmented tray, or any other type of container suitable for retaining the blend.

In another embodiment of the present invention, the method may further comprises pulverizing the lyophilized soybean past blend made with sea urchin eggs before the packing step.

In another aspect thereof, the present invention provides an instant food-type soybean paste blend made with sea urchin eggs, manufactured by a method for manufacturing an instant-type soybean paste blend made with sea urchin eggs, comprising the steps of: grinding lyophilized sea urchin eggs to give a powder of lyophilized sea urchin eggs; blending about 100 parts by weight of a soybean paste, aged for at least one year, with between about 16 to 30 parts by weight of the ground sea urchin eggs; lyophilizing the soybean paste blend with sea urchin eggs for between about 15 to 20 hours to a water content of between about 5 to 10%; and packing the lyophilized soybean paste blend made with sea urchin eggs.

BRIEF DESCRIPTION OF THE DRAWINGS

The foregoing and other objects and advantages of the invention and the manner in which the same are accomplished will become clearer based on the following detailed description taken in conjunction with the accompanying drawings in which:

FIG. 1 is a block diagram showing one embodiment of a process of manufacturing an instant food-type soybean paste blend made with sea urchin eggs of the present invention.

DETAILED DESCRIPTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is described in detail with reference to the drawing. FIG. 1 shows the manufacture of an instant food-type soybean paste blended with sea urchin eggs in a stepwise manner in a process block diagram.

With reference to FIG. 1, first, sea urchin eggs, whether fresh or having been stored in a frozen state, are ground using a grinder.

A variety of nutrients including proteins, vitamin B and C, iron, magnesium, etc. is found in abundance in sea urchin eggs which are known as being a healthy food for tuberculosis patients. Also, the specific savory flavor makes sea urchin eggs useful as an appetizer for patients who are in a convalescent stage or those who lose their appetite.

Useful in the present invention are therefore the sea urchin eggs which are preferably stored in a fresh state or in a frozen state for between about 1 to 2 days lest they lose the nutrients.

The soybean paste which is aged for one or more years is useful in the present invention.

Afterwards, the ground sea urchin eggs are blended in an amount of from between about 16 to 30 weight parts per 100 weight parts of the soybean paste to afford a soybean paste blend with sea urchin eggs. In one embodiment, the ground sea urchin eggs are homogenously blended with the soybean paste.

Subsequently, the soybean paste blend with sea urchin eggs is molded into a desired form, such as a cube, a cylinder, a sphere, etc. using a mold of the same form.

Next, the molded soybean paste blend with sea urchin eggs may be lyophilized at 40° C. or less to a water content of between about 5 to 7%.

The resulting lyophilized soybean paste blend may be packed in unit doses of between about 15 to 20 parts by weight.

The package container for accommodating the soybean paste blend may comprise a plurality of compartments with the same shape as that of the lyophilized soybean paste blend.

A better understanding of the present invention may be obtained through the following examples which are set forth to illustrate, but are not to be construed as limiting the present invention.

EXAMPLES

Lyophilized sea urchin eggs were ground using a grinder.

The soybean paste aged for one or more years was prepared.

100 parts by weight of the prepared soybean paste was blended with 25 parts by weight of the ground sea urchin eggs to give a soybean paste blend.

Using a mold, the soybean paste blend was molded into rectangular parallelepipeds.

The molded soybean paste blend was lyophilized to a water content of 7% or less at 40° C. or less.

Then, the lyophilized soybean paste blend was vacuum packed in unit doses of 17 parts by weight and placed in the compartments of a container.

Since it is packed in a unit dose suitable for one meal, the soybean paste blend with sea urchin eggs can be readily used in the amount precisely required for cooking.

Blended with ground sea urchin eggs, the soybean paste is rich in various nutrients such as protein, vitamin B and C, iron, magnesium, and other nutrients. When used for cooking, the soybean paste blend adds the flavor of sea urchin eggs to the food, and the nutrients of both the soybean paste and the sea urchin eggs are provided thereto.

Additionally, lyophilization makes it easy to store the soybean paste in a package in a freezer and to use it where necessary.

Further, the lyophilized soybean paste blend is not susceptible to the putrefaction problem which results during storage and from which the conventional soybean paste suffers, and can thus be commercially distributed in an economically profitable manner.

In accordance with an alternative example of the present invention, the method for preparing an instant food-type soybean paste blend made with sea urchin eggs further comprises pulverizing the lyophilized soybean paste blend with sea urchin eggs prior to packing the lyophilized soybean paste blend with sea urchin eggs in unit doses. That is, this alternative method is the same as that described above with the exception that the lyophilized soybean paste blend made with sea urchin eggs is pulverized into a powder and packed as described below.

After the lyophilization of the soybean paste blend with sea urchin eggs, it is pulverized into a powder using a pulverizer.

Like powdered soup, this powder may be packed in a vinyl package, such as stick-type, throwaway vinyl pack, a rectangular vinyl bag, or any other packaging capable of retaining the powder.

The instant food-type soybean paste manufactured in accordance with the method of the present invention can be stored for a long period of time and used conveniently when and where necessary.

Packed in a unit dose suitable for one meal, as described hitherto, the soybean paste blend made with sea urchin eggs can be readily used in the precise amount necessary for cooking. Blended with ground sea urchin eggs, the soybean paste is rich in various nutrients. Foods cooked with the soybean paste blend are imparted with the flavor of sea urchin eggs and the nutrients of the soybean paste as well as those of the sea urchin eggs. Lyophilization makes the soybean paste easy to store as a package in a freezer and to commercially distribute.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

In the drawings and specification, there have been disclosed typical embodiments on the invention and, although specific terms have been employed, they have been used in a generic and descriptive sense only and not for purposes of limitation, the scope of the invention being set forth in the following claims.

The invention claimed is:

1. A method for manufacturing a soybean paste blend made with sea urchin eggs, comprising the steps of:
   grinding lyophilized sea urchin eggs into a powder of lyophilized sea urchin eggs;
   blending a desired amount by weight of aged soybean paste with a desired amount by weight of the ground sea urchin eggs;
   lyophilizing the soybean paste blend with sea urchin eggs for a desired time to a desired water content; and
   packing the lyophilized soybean paste blend made with sea urchin eggs.

2. The method according to claim 1, wherein the blending step comprises blending about 100 parts by weight of the aged soybean paste with between about 16 to 30 parts by weight of the ground sea urchin eggs.

3. The method according to claim 1, wherein the soybean paste has been aged for at least one year.

4. The method according to claim 1, wherein the lyophilizing step comprises lyophilizing the soybean paste blend with the sea urchin eggs for between about 15 to 20 hours.

5. The method according to claim 1, wherein the lyophilizing step comprises lyophilizing the soybean paste blend with the sea urchin eggs to a water content of between about 5 to 10%.

6. The method according to claim 1, further comprising the step of pulverizing the lyophilized soybean paste blend made with sea urchin eggs before the packing step.

7. The method according to claim 1, wherein the packing step is performed using a container selected from the group consisting of a flexible bag, a flexible tube, and a multi-compartmented tray.

8. A method for manufacturing an instant-type soybean paste blend made with sea urchin eggs, comprising the steps of:
   grinding lyophilized sea urchin eggs to provide a powder of lyophilized sea urchin eggs;

blending about 100 parts by weight of a soybean paste, aged for at least one year, with between about 16 to 30 parts by weight of the ground sea urchin eggs;

lyophilizing the soybean paste blend with sea urchin eggs for between about 15 to 20 hours to a water content of between about 5 to 10%; and packing the lyophilized soybean paste blend made with sea urchin eggs.

9. The method according to claim 8, wherein the packing step is performed using a container or a vinyl bag.

10. The method according to claim 8, further comprising the step of pulverizing the lyophilized soybean past blend made with sea urchin eggs before the packing step.

11. An instant food-type soybean paste blend made with sea urchin eggs, manufactured using the method of claim 8.

12. An instant food-type soybean paste blend made with sea urchin eggs, the blend comprising:

about 100 parts by weight of aged soybean paste; and between about 16 to 30 parts by weight of powdered sea urchin eggs;

wherein the soybean paste and sea urchin egg blend is lyophilized for between about 15 to 20 hours to achieve a water content of between about 5 to 10%.

* * * * *